United States Patent [19]
Hall et al.

[11] Patent Number: 4,884,994
[45] Date of Patent: * Dec. 5, 1989

[54] AXIAL FLOW ROTARY SEPARATOR

[75] Inventors: James W. Hall, Bettendorf, Iowa; Maurice A. Popelier, East Moline, Ill.; Josef W. Klimmer, Zweibrucken, Fed. Rep. of Germany; Neil L. West; Loren W. Peters, both of Bettendorf, Iowa

[73] Assignee: Deere & Company, Moline, Ill.

[*] Notice: The portion of the term of this patent subsequent to Sep. 16, 2003 has been disclaimed.

[21] Appl. No.: 144,773

[22] Filed: Jan. 20, 1988

Related U.S. Application Data

[63] Continuation of Ser. No. 861,468, May 9, 1986, abandoned, which is a continuation-in-part of Ser. No. 646,346, Aug. 29, 1984, Pat. No. 4,611,605.

[51] Int. Cl.$^4$ ............................................. A01F 7/06
[52] U.S. Cl. ..................................... 460/66; 460/80; 460/122
[58] Field of Search ............... 56/14.5, 16.5; 460/80, 460/66, 122, 121, 69–71, 73, 88, 89

[56] References Cited

U.S. PATENT DOCUMENTS

| | | | |
|---|---|---|---|
| 574,303 | 12/1896 | Butterworth | 130/23 |
| 640,400 | 1/1900 | Miller | 130/22 A |
| 723,670 | 3/1903 | Hixson | 130/22 A |
| 1,033,658 | 7/1912 | Bateman | 130/27 N |
| 1,149,253 | 8/1915 | Dickerson | 130/22 A |
| 1,193,751 | 8/1916 | Bangen . | |
| 1,604,912 | 10/1926 | Hathaway | 130/27 T |
| 1,744,334 | 1/1930 | Schlayer | 130/27 T |
| 2,050,631 | 8/1936 | Schlayer | 130/27 T |
| 4,408,618 | 10/1983 | Witzel | 130/27 T |
| 4,611,605 | 9/1986 | Hall et al. | 130/27 T X |
| 4,739,773 | 4/1988 | West et al. | 130/27 R |

Primary Examiner—Hoang C. Dang

[57] ABSTRACT

In an axial flow rotary separator, the crop material engaging elements of the eccentrically mounted rotor include helically oriented deflecting surfaces of significant axial extent which in operation, sweep closely or "wipe" a separating grate of the separator casing while the helical surfaces contribute to axial indexing of the material.

19 Claims, 4 Drawing Sheets

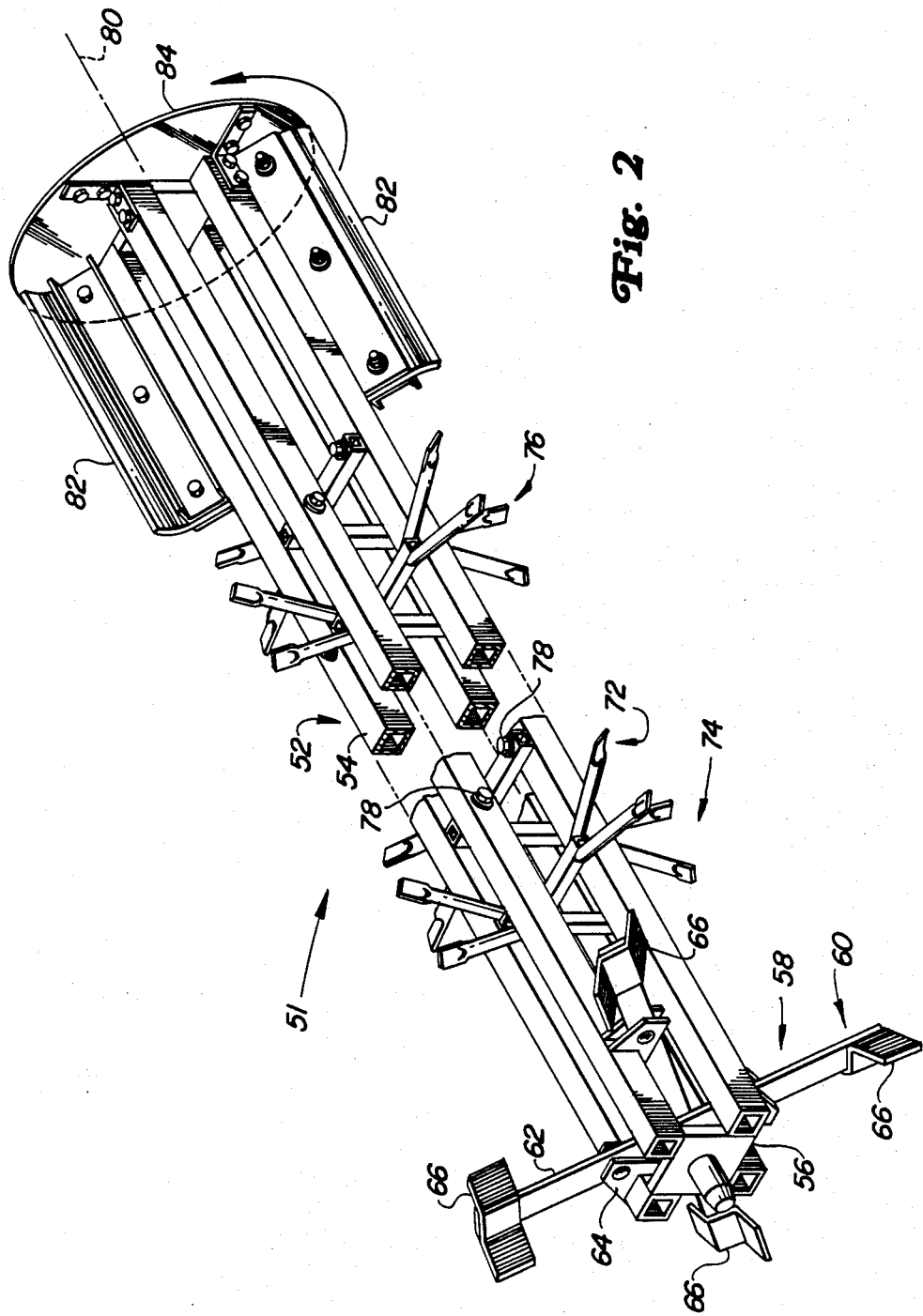

U.S. Patent  Dec. 5, 1989  Sheet 4 of 4  4,884,994
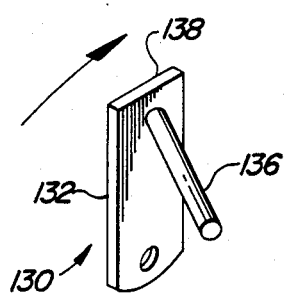
Fig. 9
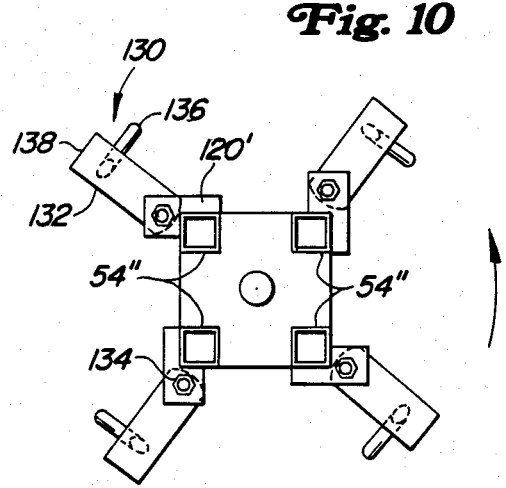
Fig. 10
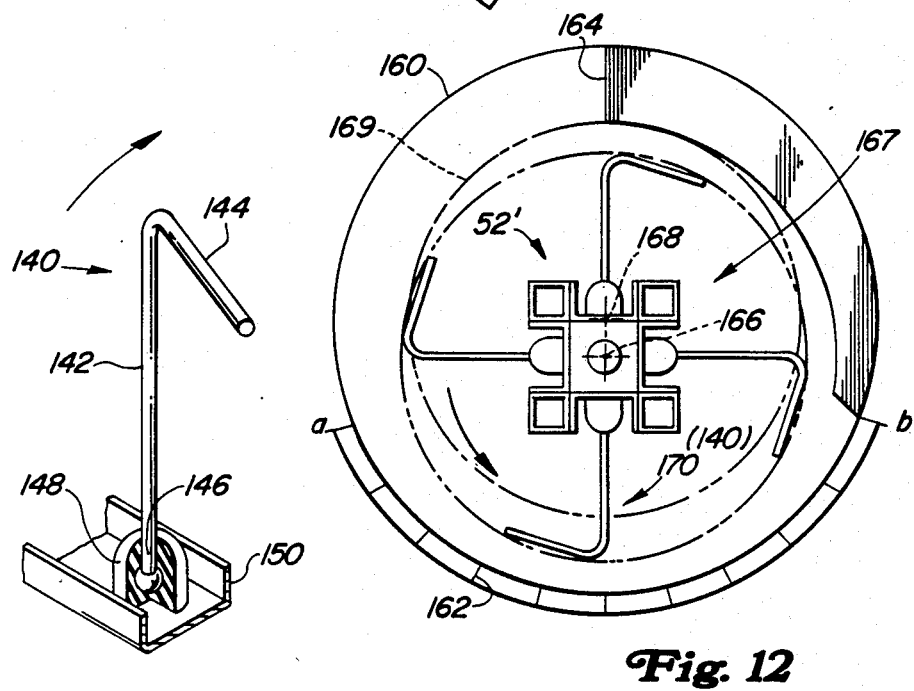
Fig. 11
Fig. 12

AXIAL FLOW ROTARY SEPARATOR

This application is a continuation of application Ser. No. 861,468, now abandoned, filed 9 May 1986, which is a continuation-in-part of application Ser. No. 646,346, now U.S. Pat. No. 4,611,605, filed 29 Aug. 1984.

CROSS REFERENCE TO RELATED APPLICATION

U.S. Pat. Application Ser. No. 861,467, now U.S. Pat. No. 4,729,773 filed simultaneously herewith in the same of West et al, entitled "Feeding Arrangement for an Axial Flow Rotary Separator" and assigned to the assignee of the invention herein, is directed in preferred embodiment to the feeding of a twin rotor axial flow rotary separator using two-stage feed rotors in combination with a feed casing which includes truncated cylindrical surfaces. To the extent that the invention disclosed and claimed in application Ser. No. 861,467 is disclosed herein, it is done so only for completeness of description of the operative environment of the invention claimed herein and thus forms no part of the invention claimed herein.

BACKGROUND OF THE INVENTION

This invention concerns axial flow rotary separators of the type used to separate threshed material in combine harvesters and more particularly separators in which rotors with tined or finger-like elements are used to propel material circumferentially within a cylindrical casing while helical guide elements provide at least a part of the required axial indexing effect.

In separator rotors using tines or finger-like elements it is already known to provide some form of yielding or pivoting of the element with respect to the rotor frame. Hall et al. for example, in U.S. patent application Ser. No. 646,346 now U.S. Pat. No. 4,611,605, discloses finger elements pivoted about an axis perpendicular to the rotor axis so that the fingers, while in engagement with a crop material mat, spiraling downstream under the influence of helical guide vanes, may move pivotably downstream with the mat so that the flow of the mat is not impeded. Schlayer in U.S. Pat. Nos. 1,688,662; 1,744,334 and 1,744,336 suggests yieldability of crop engaging elements in a plane perpendicular to the rotor axis but not pivoting or yielding in the direction taught by Hall. Schlayer (in '334) also teaches twisting the radially outward tips of the crop engaging elements so as to "feed the material in the direction towards the discharge end. Such feeding action is caused by the current of air produced by the helical form and also by the threshing members acting on the material in angular direction."

Use of the radially outward tip of the crop engaging element of the rotor to assist in axial propulsion is also disclosed in U.S. Pat. No. 723,670 Hixson in which the tip of a basically radially extending rod is bent into a generally axial but somewhat helical alignment so as to assist in axial propulsion while at the same time passing close enough to a separating grate portion of the casing, to assist in wiping material over the grate.

Each of the known crop material engaging element arrangements, by themselves or in combination with the particular separator casings and other components with which they are associated, operate moderately successfully but leave room for improvement.

SUMMARY OF THE INVENTION

Accordingly, it is an object of the invention to provide, in an axial flow rotary separator rotor, generally radially extending crop material engaging elements which are yieldably mounted on the rotor frame and which are modified at their radially outward tips to provide generally helical surfaces contributing to axial propulsion and which, in combination with a suitable grate in a generally cylindrical separator casing, separate threshed grain efficiently with a minimum of chaff generation while handling a variety of crops over a wide range of feed rates.

In axial flow rotary separators according to the invention, rotors are preferably mounted eccentrically so that, during a portion of the rotor revolution, the radially outward portion of the crop material engaging element sweeps closely over a foraminous portion or grate of the casing. The element itself includes a deflecting surface of such axial extent as to have a significant wiping effect with respect to the grate and of such helical disposition as to contribute to the axial propulsion of the crop material. In addition, it is a feature of the invention to attach the crop material engaging element to the rotor frame in such a way that it can yield to reduce the effective diameter of the rotor when overloaded locally with an excess flow of crop material (or a foreign body), momentarily causing a tendency to plug the separator. Preferably, this yielding is principally in a plane perpendicular to the axis of rotation of the rotor.

BRIEF DESCRIPTION OF THE DRAWINGS

FIG. 2 is a left, front perspective view of a separator rotor from one of the separator units of the combine harvester.

FIG. 9 is a perspective view of a second alternative crop-material engaging element for the rotor.

FIG. 10 is a cross-sectional view similar to FIG. 8 of a cross-sectional view of a rotor embodying the element of FIG. 9.

FIG. 11 is a partial view of a rotor with a third alternative crop-material engaging element showing its attachment to the rotor frame.

FIG. 12 is a view similar to FIG. 8 of a cross-section of a rotor embodying the element of FIG. 11, combined with a generic, schematic cross-section of an axial flow rotary separator, showing the relationship of rotor to separator casing and helical guide vanes in the casing.

DESCRIPTION OF THE PREFERRED EMBODIMENT

Figure 1:
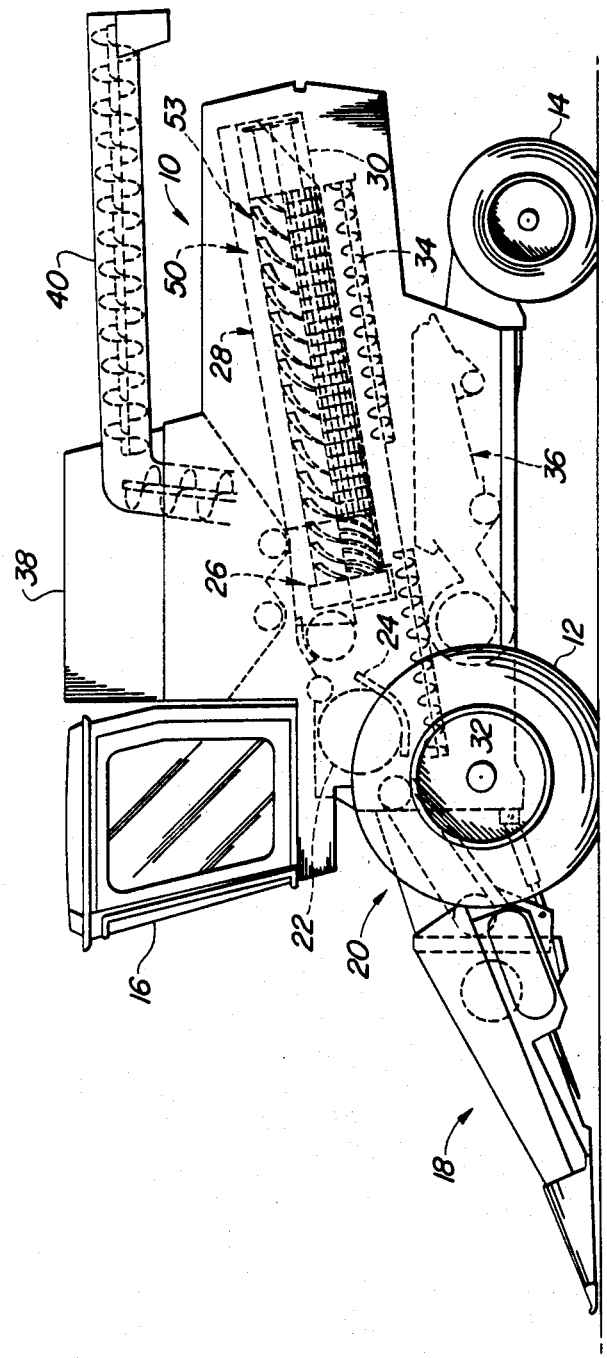
FIG. 1 is a left-hand side elevation of a self-propelled combine harvester embodying the invention.

The invention is embodied in a self-propelled combine harvester shown in FIG. 1.

The combine body 10 is supported on front drive wheels 12 and steerable rear wheels 14 and controlled from an operator's station 16. Gathering the crop from the field and threshing is by conventional components, the header in this case being a corn head 18 delivering gathered material by way of a feederhouse 20 to a threshing cylinder and concave 22, 24 respectively.

Downstream delivery from the threshing cylinder and concave is by means of a separator feed section 26, to the twin rotor axial flow rotary separator 28 which discharges straw at a rear discharge 30. Separated grain is passed downwards to return conveyors 32, 34 for delivery to a conventional cleaning shoe 36. From the cleaning shoe, clean grain is elevated to a grain tank 38 by a clean grain elevator (not shown). Grain is unloaded by unloading auger assembly 40.

In the present embodiment, the separator 28 comprises two side-by-side axial flow rotary separator units, but only one (the left-hand) separator unit 50 is visible in FIG. 1. The typical configuration and operation of axial flow rotary separators with eccentrically mounted rotors and relying on helical guide elements in the separator casing for axial indexing is already known (see for example application, Ser. No. 646,346, now U.S. Pat. No. 4,611,605 Hall et al., hereby incorporated by reference). A brief description of their function and operation is also given below with reference to FIG. 12.

The rotor 51 of separator unit 50, housed in a separator casing 53, is shown in some detail in FIG. 2. The rotor frame 52 consists of four parallel longitudinal tubes 54 rigidly attached to and spaced by spacer plates 56. The front or divider rotor portion 58 consists of a pair of paddle assemblies 60 in each of which a diametrical arm 62, secured to the rotor frame 52 by lugs 64, carries at its opposite radial extremities a paddle 66.

In the present embodiment, identical crop-engaging material elements 72 are used in both the main feed portion 74 and the separator portion 76 of the rotor. Each element 72 is pivoted to the rotor frame 52 by a pivot 78 permitting it to swing in a plane parallel to the rotor axis of rotation 80. The downstream end of the rotor separator portion 76 consists of a discharge arrangement including a pair of diametrically opposite discharge paddles 82 and a circular baffle plate 84 fixed to the rotor frame 52 and concentric with the rotor axis 80.

Figure 5:
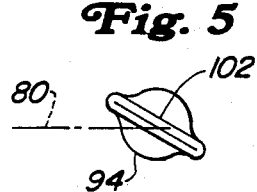
FIGS. 5 and 6 are partial views of the crop material engaging tips of the rotor element taken approximately on lines 5—5 and 6—6 respectively of FIG. 3.
Figure 6:
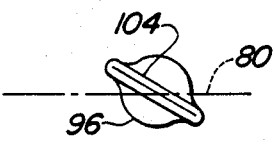

The "Y" shaped crop material engaging element or finger 72, pivotally mounted to the rotor frame by the pivot arrangement 78 and seen best in FIGS. 3–6, consists of an elongated shank 90 of square tubular section to which are attached, preferably by arc welding, crop material engaging arms 94, 96 respectively made from round tubing. The radial extremities 98, 100, respectively, of these arms are the principal propelling portions of the element and are flattened to create crop deflecting surfaces 102, 104, respectively, as indicated in FIGS. 5 and 6. These surfaces, 102, 104 are angled at 30 degrees from the plane of the finger 72 (which, in assembly, is parallel to the rotor axis 80). There is sufficient clearance in the finger pivot 78 that rotationally rearward deflection of the finger 72 is resisted by the finger bearing on the frame member 54 at a bearing surface 106 of the shank 90. The rotor is driven in a counter clockwise direction as viewed from the upstream or inlet end of the rotor, which is on the left in FIG. 2, the direction of rotation being indicated by the arrows in FIGS. 2 and 4. Thus, the rotationally leading edge of the crop deflecting portion or surface 102 is toward the left in FIG. 4, and engagement of the crop deflecting surface 102 with crop material will urge the material downstream or toward the outlet end of the separator. The downstream edge of the crop deflecting surface 102 is on the right as viewed in FIG. 4, so that material moves away from viewer in FIG. 4, albeit in a spiral path, toward the separator outlet end. In FIG. 5, the rotationally leading edge of the surface 102 is at the left, above the reference line 80, and the rotationally trailing edge is to the right and below the reference line 80, so that, as the finger 72 rotates, moving upwardly in FIG. 5, the surface 102 engages crop material and wedges it downstream or to the right in FIG. 5.

In a first alternative embodiment of crop material engaging element (FIGS. 7 and 8), the finger 110 is made in one piece from a flat bar of material has a shank portion 112 and a radially outward tip portion 114 which has opposite crop material deflecting edges 116, 118 angled in the same way and to about the same degree with respect to the rotor axis of rotation as the crop deflecting surfaces 102, 104 of the previous embodiment. These flail-like elements are pivotably mounted to frame members 54' by fixed lugs 120 so that the elements may pivot about axes parallel to the axis of the rotor on pivots 122.

A third embodiment of crop material engaging element, finger 130, shown in FIGS. 9 and 10, is also of the flail type. It consists of a flat bar shank 132 carried by pivot arrangement 134 and lugs 120' on frame members 54' of the rotor. In this case, particular or additional angled crop deflecting surfaces are provided by the arm 136 rigidly attached to but inset from the end or radial tip 138 of the shank 132.

In a fourth embodiment of crop material engaging element (FIGS. 11 and 12), finger 140 is formed from a single rod into a shank 142 and a generally axially extending tip 144. The tip 144 is angled from the axial direction in the same direction and about the same amount as the surfaces 102, 104 of the embodiment of FIG. 3. The included angle between shank 142 and tip 144 is preferably less than ninety degrees, or the tip may be curved, so that it conforms more closely to the curve of the separator casing. A root portion 146 of the shank 142 is embedded in and resiliently secured in a resilient base 148 carried in a channel 150 secured between frame members of a rotor frame 52'.

In operation, as the combine harvester advances over the field, gathered crop is threshed and delivered to the axial flow rotary separator units including left-hand unit 50. The general operation of such a unit is described in detail elsewhere, for example in U.S. Pat. No. 4,611,605 Hall, and will be described only briefly here, with reference to FIG. 12, which includes a cross-sectional schematic representation of a separator unit. The casing 160 is generally cylindrical and includes a foraminous grate 162 in its lower half and a series of helically disposed guide vanes 164 in an upper quadrant of the casing.

Figure 7:
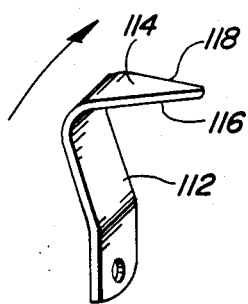
FIG. 7 is a perspective view of an alternative crop material engaging element of the rotor.

The rotational axis 166 of the rotor 167 is offset downwards from the center 168 of the casing 160 towards the grate 162. In normal operation, crop material is propelled through the casing 160 in a generally spiral path as a mat 169 generally in contact with the inside of the casing. Thus, with finger-like elements 170 of the same general type (140) as described above, because of the eccentricity, the penetration or engagement of the fingers with the mat 169 varies as the rotor rotates. During each revolution, a crop material engaging element 170 passes relatively close to the grate 162 in a separating phase, for example, approximately from a to b in FIG. 12. In this phase, separating function is enhanced by a wiping action of the element over the grate, encouraging separation and assisting in keeping the grate free of accumulations of crop material. In the embodiments of FIGS. 7, 9 and 11 especially, the radial extremities of the elements have significant axial extension to assist in this wiping action.

In the upper half of each revolution, the crop material engaging element 170 is largely disengaged from the mat. The speed of rotation of the rotor is such that the material is propelled upwards, is engaged by the guide vanes 164 and indexed downstream and, by the action of centrifugal force, is carried above the rotor, generally in contact with the casing and on around to be re-engaged by the rotor elements 170. In all of the embodiments, the angling of radially extreme surfaces with respect to the longitudinal axis of the rotor also deflects material so as to contribute to the total axial indexing effect of the separator.

Figure 3:
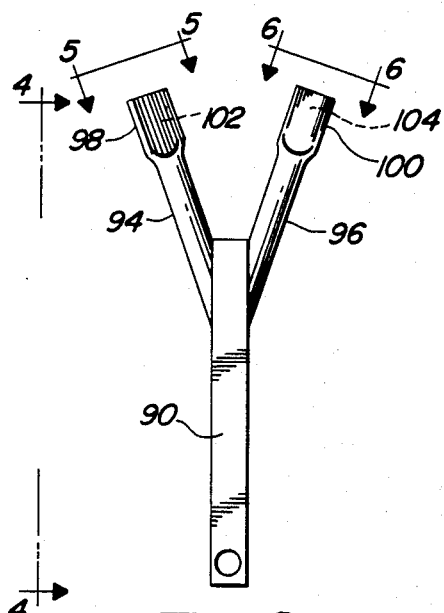
FIG. 3 is an enlarged view of a crop-engaging element from the rotor of FIG. 2.
Figure 4:
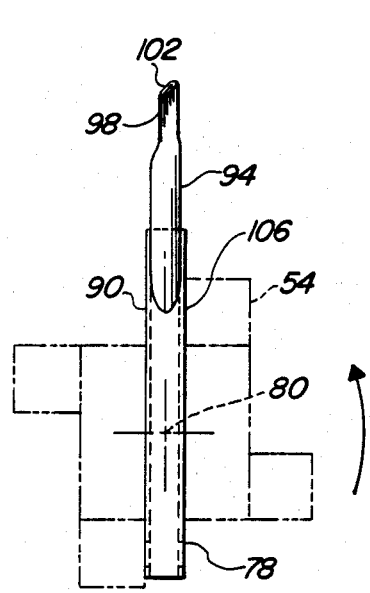
FIG. 4 is a side elevation of the rotor element of FIG. 3 showing its relationship to the rotor frame.

The "Y" form of finger 72 shown in the separator portion of FIG. 2 and in more detail in FIGS. 3 and 4, through its tubular welded construction, combines light weight with strength. Its support towards its radial extremity by the frame member 54 at bearing surface 106 gives it relatively high strength for circumferentially propelling crop material at high rates of throughput. If required by a particular crop flow condition, loading on the finger and hence, on the total rotor, may be relieved by sideways retraction of the finger pivoting about pivot 78.

Figure 8:
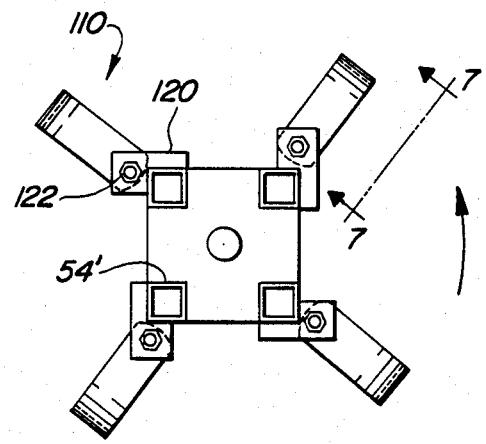
FIG. 8 is a cross-sectional view of a rotor embodying the element of FIG. 7.

In the "flail" type elements of FIGS. 7 and 9, in normal operation, centrifugal force maintains the pivoted elements in approximately radial extension as shown in FIGS. 8 and 10. However, in encountering an obstacle or an overload situation, the elements may retract, swinging about their pivots in a plane perpendicular to the axis of rotation of the rotor effectively reducing the outside diameter of the rotor. The particular form of the element of FIG. 9 with the arm 136 radially inset from the end of the shank 132 has advantages in harvesting corn, the form reducing the likelihood and adverse effect of jamming corn cobs between the tip of the element and the grate.

The slender form of the embodiment of FIG. 11 is advantageous in allowing the element to penetrate the crop material mat with a minimum of compression of the mat while the length of the "tail" or tip 144 still provides substantial surfaces for handling crop material.

We claim:

1. In an axial flow rotary separator having an at least partially foraminous casing, in which crop material is propelled downstream in a generally spiral path as an annular mat generally in contact with the inside of the casing, the casing carrying internal guide surfaces for engaging the crop material mat and oriented so as to assist the downstream movement of the mat, a rotor mounted eccentrically towards a foraminous portion of the casing, for rotation about an axis of rotation generally parallel to the longitudinal axis of the casing and for propelling the crop material through the casing, comprising:
   a frame;
   a plurality of generally radially extending crop material engaging elements carried by the frame, each element being pivotably attached to the frame for pivoting displacement under operating load in a direction such as to increase radial clearance between the element and the casing, and including an outer crop-propelling portion, said portion having a predominating crop deflecting surface, said surface having a rotationally leading portion and a rotationally trailing portion downstream of the leading portion so that in operation, crop material engaged by the deflecting surface is urged in a downstream direction.

2. The rotor of claim 1 wherein, upon rotation, the radial extremities of the crop material engaging elements generate a cylindrical surface of revolution and wherein at least a portion of the crop deflecting surface extends approximately in that surface of revolution and wherein during each revolution of the rotor, each crop deflecting surface approaches the foraminous portion of the separator casing with a wiping action and, because of the eccentric mounting of the rotor, successively increases and decreases its radial penetration of the crop material mat.

3. The rotor of claim 1 wherein the pivotal attachment of each crop material engaging element comprises a pivot having a pivot axis so that when the rotor is rotated, each element may, due to centrifugal force, assume an upright radial position and oriented so that pivoting of the crop material engaging element away from the upright radial position increases the radial clearance between the crop deflecting surface and the casing wall.

4. The rotor of claim 3 wherein each crop material engaging element has a generally radial extent and the pivot axis is approximately perpendicular to that radial extent and also perpendicular to the axis of rotation of the rotor.

5. The rotor of claim 4 wherein the radial extent of the crop material engaging element spans the axis of rotation of the rotor so that, for each element, the respective pivot axis and crop deflecting surface are on opposite sides of the axis of rotation.

6. The rotor of claim 5 wherein the rotor frame further includes a plurality of support surfaces, each surface engaging a crop material engaging element intermediate its pivot and its crop deflecting surface for providing sliding bearing support for the element and resisting deflection of the element in a circumferential direction while permitting pivoting of the element about its pivot axis.

7. The rotor of claim 4 wherein the crop material engaging element comprises a generally rod-like form having a radially outward extremity, said extremity being widened and flattened to define the crop deflecting surface.

8. The rotor of claim 4 wherein the crop engaging element is tubular and wherein a radially outward portion of the element is flattened to define the crop deflecting surface.

9. The rotor of claim 4 wherein the crop material engaging element is bifurcated to define a pair of fingers and each finger includes one of the crop deflecting surfaces.

10. The rotor of claim 3 wherein the pivot axis is parallel to the axis of rotation.

11. The rotor of claim 10 wherein the crop material engaging element comprises a radially extending shank, pivotably connected to the pivot and, extending from the shank adjacent its radial extremity, a crop propelling portion including the crop deflecting surface extending peripherally of the rotor.

12. The rotor of claim 11 wherein the crop propelling portion is radially inset from the outer radial extremity of the shank.

13. The rotor of claim 12 wherein the shank is a flat member of approximately the rectangular cross section having opposite faces and lying generally in the plane of rotation of the shank and the crop propelling portion is a rod-like member extending obliquely from a face of the shank.

14. The rotor of claim 11 wherein the crop material engaging element is formed from a single elongated piece of rigid material generally in the form of an "L" with the upright of the "L" comprising the shank and the base of the "L" the crop propelling portion, said propelling portion being tapered to define the crop deflecting surface.

15. The rotor of claim 10 wherein the pivot axis lies between the crop propelling portion and the axis of rotation of the rotor.

16. The rotor of claim 1 wherein the deflectable attachment of the crop material engaging element to the frame comprises a resilient mounting fixed to the frame and the crop material engaging element has a root portion, said root portion being embedded in the resilient mount.

17. The rotor of claim 16 wherein the crop material engaging element comprises a finger formed from an elongated rod into a first radially extending portion and a second, in terms of the periphery swept by the rotor, a peripherally extending crop propelling portion including the crop deflecting surface.

18. The rotor of claim 17 wherein the finger is approximately "L" shaped and oriented so that the base of the "L" defines the crop deflecting surface.

19. The rotor of claim 9 wherein the crop deflecting surfaces both lie substantially in a plane perpendicular to the pivot axis of the crop material engaging element.

* * * * *